United States Patent
Urata et al.

(10) Patent No.: US 12,157,752 B2
(45) Date of Patent: Dec. 3, 2024

(54) PERFLUOROPOLYETHER PHOSPHATE ESTER, METHOD FOR PRODUCING THE SAME, AND SURFACE TREATMENT AGENT COMPRISING THE SAME AS ACTIVE INGREDIENT

(71) Applicant: UNIMATEC CO., LTD., Tokyo (JP)

(72) Inventors: Kimihiko Urata, Ibaraki (JP); Yuichiro Oda, Ibaraki (JP); Takuya Kondo, Ibaraki (JP); Yoshiyama Kaneumi, Ibaraki (JP)

(73) Assignee: UNIMATEC CO., LTD., Tokyo (JP)

( * ) Notice: Subject to any disclaimer, the term of this patent is extended or adjusted under 35 U.S.C. 154(b) by 872 days.

(21) Appl. No.: 16/973,970

(22) PCT Filed: May 31, 2019

(86) PCT No.: PCT/JP2019/021819
§ 371 (c)(1),
(2) Date: Dec. 10, 2020

(87) PCT Pub. No.: WO2019/239927
PCT Pub. Date: Dec. 19, 2019

(65) Prior Publication Data
US 2021/0253610 A1 Aug. 19, 2021

(30) Foreign Application Priority Data
Jun. 14, 2018 (JP) ................. 2018-113614

(51) Int. Cl.
| | | |
|---|---|---|
| B29C 33/62 | (2006.01) | |
| C07F 9/09 | (2006.01) | |
| C08G 65/327 | (2006.01) | |
| B29C 33/60 | (2006.01) | |
| C08G 65/00 | (2006.01) | |
| C09D 5/00 | (2006.01) | |
| C09K 3/18 | (2006.01) | |

(52) U.S. Cl.
CPC .............. C07F 9/091 (2013.01); B29C 33/62 (2013.01); C07F 9/09 (2013.01); C08G 65/327 (2013.01); B29C 33/60 (2013.01); C08G 65/007 (2013.01); C09D 5/00 (2013.01); C09K 3/18 (2013.01)

(58) Field of Classification Search
CPC . C07F 9/091; C07F 9/09; B29C 33/62; B29C 33/60; C09D 5/00; C09K 3/18; C08G 65/327; C08G 65/007
See application file for complete search history.

(56) References Cited

U.S. PATENT DOCUMENTS

| | | | |
|---|---|---|---|
| 3,293,306 A * | 12/1966 | Le Bleu | C07F 9/091 |
| | | | 162/158 |
| 3,306,855 A | 2/1967 | Borecki et al. | |
| 3,492,374 A * | 1/1970 | Le Bleu | C14C 9/00 |
| | | | 544/110 |
| 6,184,187 B1 | 2/2001 | Howell et al. | |
| 6,559,108 B1 | 5/2003 | Howell et al. | |
| 7,989,566 B2 | 8/2011 | Coughlin et al. | |
| 7,999,049 B2 | 8/2011 | Coughlin et al. | |
| 2009/0171127 A1 | 7/2009 | Murata et al. | |
| 2009/0186969 A1 | 7/2009 | Coughlin et al. | |
| 2009/0186997 A1* | 7/2009 | Coughlin | C07F 9/091 |
| | | | 526/193 |
| 2011/0257423 A1 | 10/2011 | Coughlin et al. | |
| 2019/0040195 A1 | 2/2019 | Takao | |

FOREIGN PATENT DOCUMENTS

| | | |
|---|---|---|
| CN | 101925618 A | 12/2010 |
| CN | 105086825 A | 11/2015 |
| JP | S53-23270 A | 7/1978 |
| JP | S53-23271 A | 7/1978 |
| JP | S57-48035 A | 10/1982 |
| JP | H05-222070 A | 8/1993 |
| JP | 2002-510697 A | 4/2002 |
| JP | 2012-201709 A | 10/2012 |
| WO | 2007/080949 A1 | 7/2007 |

(Continued)

OTHER PUBLICATIONS

Dr. Alfred D. Bacher, "Drying Agent", Mar. 2016, University of California at Los Angeles (Year: 2016), https://www.chem.ucla.edu/~bacher/Specialtopics/Drying%20Agents.html.*

(Continued)

Primary Examiner — Anthony J Green
Assistant Examiner — Marites A Guino-O Uzzle
(74) Attorney, Agent, or Firm — GREENBLUM & BERNSTEIN, P.L.C.

(57) ABSTRACT

A perfluoropolyether phosphate ester represented by the general formula:

$$[C_3F_7O\{CF(CF_3)CF_2O\}_nCF(CF_3)CH_2O]_2PO(OH)$$

(wherein n is an integer of 1 to 20). This compound is obtained by reacting a perfluoropolyether alcohol represented by the general formula:

$$C_3F_7O\{CF(CF_3)CF_2O\}_nCF(CF_3)CH_2OH$$

(wherein n is an integer of 1 to 20) with phosphorus oxychloride, and hydrolyzing the obtained compound represented by the general formula:

$$[C_3F_7O\{CF(CF_3)CF_2O\}_nCF(CF_3)CH_2O]_2POCl$$

(wherein n is an integer of 1 to 20). Moreover, the perfluoropolyether phosphate ester or a salt thereof forms a surface treatment agent comprising the perfluoropolyether phosphate ester or a salt thereof as an active ingredient.

1 Claim, No Drawings

(56) References Cited

FOREIGN PATENT DOCUMENTS

WO 2016/043118 A1 3/2016

OTHER PUBLICATIONS

TCI Chemicals, Fluorous Solvents, Jul. 8, 2015, https://www.tcichemicals.com/US/en/c/12585 (Year: 2015).*
International Search Report, WIPO, Application No. PCT/JP2019/021819, issued Aug. 27, 2019, English translation.
International Preliminary Report on Patentability, WIPO, Application No. PCT/JP2019/021819, issued Dec. 15, 2020, English translation.

* cited by examiner

PERFLUOROPOLYETHER PHOSPHATE ESTER, METHOD FOR PRODUCING THE SAME, AND SURFACE TREATMENT AGENT COMPRISING THE SAME AS ACTIVE INGREDIENT

TECHNICAL FIELD

The present invention relates to a perfluoropolyether phosphate ester, a method for producing the same, and a surface treatment agent comprising the same as an active ingredient. More particularly, the present invention relates to a perfluoropolyether phosphate ester that is effectively used as a mold release agent or the like, a method for producing the same, and a surface treatment agent comprising the same as an active ingredient.

BACKGROUND ART

Patent Documents 1 to 3 disclose mold release agents comprising, as a main component, a perfluoroalkylalkyl phosphate ester (salt) that does not have a $(CH_2CF_2)_n$ unit, and further containing at least one of a surfactant, silicone oil, and a highly fluorinated organic compound with a boiling point of 100° C. or higher, or silicone varnish.

These mold release agents show excellent mold release properties and are said to have a longer mold release life than conventional ones. However, with the recent complicated shapes of molded articles, further improvement in performance as mold release agents has been required. Moreover, in order to improve the mold release performance and extend the mold release life, it is necessary to add a surfactant and a silicone-based substance. No mention is made of methods for producing phosphate esters.

Further, Patent Document 4 indicates that a perfluoropolyether phosphate ester obtained by reacting a diol compound represented by the general formula:

$$HO(CH_2CH_2O)_nCH_2R^fCH_2(OCH_2CH_2)_mOH$$

$R^f$: a divalent linear perfluoropolyether group
n, m: 1 or 2 and $P_2O_5$ at a molar ratio of 1:0.25 to 0.7 can impart, to a hard surface, antifouling properties having excellent durability against abrasion and a high temperature and high humidity environment.

PRIOR ART DOCUMENT

Patent Document

Patent Document 1: JP-B-53-23270
Patent Document 2: JP-B-53-23271
Patent Document 3: JP-B-57-48035
Patent Document 4: JP-A-2012-201709
Patent Document 5: WO 2007/080949 A1

OUTLINE OF THE INVENTION

Problem to be Solved by the Invention

Perfluoropolyether group-containing compounds have a very low surface energy, and therefore have water and oil repellency, chemical resistance, lubricity, mold release properties, antifouling properties, etc. Taking advantage of these properties, these compounds are widely used for oil preventive agents for instruments, mold release agents, cosmetics, protective films, and the like.

An object of the present invention is to provide a perfluoropolyether phosphate ester particularly having excellent oil repellency, in which the oil repellency is not significantly reduced even after a durability test, a method for producing the same, and a surface treatment agent comprising the same as an active ingredient.

Means for Solving the Problem

The first object of the present invention can be achieved by a perfluoropolyether phosphate ester represented by the general formula:

$$[C_3F_7O\{CF(CF_3)CF_2O\}_nCF(CF_3)CH_2O]_2PO(OH)$$

(wherein n is an integer of 1 to 20).

Moreover, the second object of the present invention can be achieved by reacting a perfluoropolyether alcohol represented by the general formula:

$$C_3F_7O\{CF(CF_3)CF_2O\}_nCF(CF_3)CH_2OH$$

(wherein n is an integer of 1 to 20) with phosphorus oxychloride, and hydrolyzing the obtained compound represented by the general formula:

$$[C_3F_7O\{CF(CF_3)CF_2O\}_nCF(CF_3)CH_2O]_2POCl$$

(wherein n is an integer of 1 to 20).

Furthermore, the third object of the present invention can be achieved by a surface treatment agent comprising a perfluoropolyether phosphate ester represented by the general formula:

$$[C_3F_7O\{CF(CF_3)CF_2O\}_nCF(CF_3)CH_2O]_2PO(OH)$$

(wherein n is an integer of 1 to 20) or a salt thereof as an active ingredient.

Effect of the Invention

The perfluoropolyether phosphate ester according to the present invention has an effect that when various substrates, preferably metal surfaces, are treated with this ester as an organic solvent solution, preferably a fluorine-containing organic solvent solution, oil repellency to oil appears, and the oil repellency is not significantly reduced even after a durability test.

Specifically, regarding the mold release properties of a resin molded article from a mold coated with the fluorine-containing organic solvent solution, the mold release load is small, and once this is applied, mold release can be performed about 10 times at a mold release load of 50 N or less.

Therefore, the perfluoropolyether phosphate ester or a salt thereof according to the present invention is effectively used not only as a mold release agent, but also as a water and oil repellent, an antifoul processing agent, a lubricity improving agent, or the like.

EMBODIMENTS FOR CARRYING OUT THE INVENTION

The perfluoropolyether phosphate ester is obtained by reacting a perfluoropolyether alcohol (see Patent Document 5):

$$C_3F_7O\{CF(CF_3)CF_2O\}_nCF(CF_3)CH_2OH$$

n: an integer of 1 to 20, preferably 3 to 10
with phosphorus oxychloride in the presence of a dehydrating agent, such as calcium chloride, which is used at a molar ratio of about 1 to 20 based on the perfluoropolyether alcohol, and hydrolyzing the obtained compound:

[C$_3$F$_7$O{CF(CF$_3$)CF$_2$O}$_n$CF(CF$_3$)CH$_2$O]$_2$POCl with water.

[C$_3$F$_7$O{CF(CF$_3$)CF$_2$O}$_n$CF(CF$_3$)CH$_2$O]$_2$PO(OH)

Phosphorus oxychloride is used in an excess amount, generally at a molar ratio of about 5 to 10, preferably about 7 to 9, based on the perfluoropolyether. The resulting intermediate product is then hydrolyzed with water. The final product, i.e., a perfluoropolyether phosphate ester, contains a small amount of compound [C$_3$F$_7$O{CF(CF$_3$)CF$_2$O}$_n$CF(CF$_3$)CH$_2$O]PO(OH)$_2$, which is difficult to separate.

Regarding the reactions, the first stage reaction is carried out at about 100 to 120° C. for about 10 to 30 hours and removing low boiling substances under reduced pressure at an internal temperature of 90 to 110° C., followed by vacuum distillation. Next, water is slowly added dropwise so that the internal temperature does not exceed 60° C., and the hydrolysis reaction is carried out. The product is obtained by removing water from the reaction mixture under reduced pressure.

The obtained perfluoropolyether phosphate ester can also be neutralized and used in the form of a salt. The formation of a salt is generally carried out by titration with a salt forming reagent, such as sodium hydroxide, ammonium hydroxide, zinc sulfate, zinc acetate, zinc oxide, triethylamine, morpholine, triethanolamine, or tris(2-hydroxyethyl), while confirming the equivalence point with pH, to obtain an acidic monovalent to trivalent metal salt, amine salt, or ammonium salt.

Examples of perfluoropolyether phosphate ester salts to be obtained include metal salts of perfluoropolyether phosphate esters with sodium, potassium, lithium, barium, magnesium, calcium, zinc, and the like; ammonium salts; ammonium salts substituted with alkyl groups or cycloalkyl groups, such as monoethyl, monoisopropyl, diethyl, dicyclohexyl, and triethyl; ammonium salts substituted with hydroxyalkyl groups, such as monoethanol, diethanol, triethanol, diisopropanol; and the like.

The surface treatment agent using the perfluoropolyether phosphate ester or a salt thereof is prepared by dilution with an organic solvent so as to obtain an organic solvent solution having a solid matters content of about 0.01 to 30 wt. %, preferably about 0.03 to 3 wt. %. Examples of the organic solvent used include at least one kind of alcohols, such as methanol, ethanol, n-propanol, and isopropanol; ketones, such as acetone, methyl ethyl ketone, and methyl isobutyl ketone; ethers, such as diethyl ether, diisopropyl ether, dioxane, and tetrahydrofuran; esters, such as ethyl acetate and butyl acetate; polyhydric alcohol derivatives, such as methyl cellosolve, ethyl cellosolve, methyl carbitol, and ethyl carbitol; halogenated hydrocarbons, such as carbon tetrachloride, methylene chloride, trichloroethylene, perchloroethylene, trichloroethane, trichlorofluoromethane, tetrachlorodifluoroethane, trichlorotrifluoroethane; and the like. A fluorine-containing organic solvent is preferably used. As the fluorine-containing organic solvent, a commercial product, for example, NOVEC 7200 produced by 3M Company, etc., is used.

The surface treatment agent solution may contain, if necessary, various surfactants, such as an ionic one and a nonionic one, which improve the wettability of the surface treatment agent, and silicone oil and silicone varnish, etc., which further improve mold release properties, lubricity, and the like.

The surface treatment agent solution can be applied to a mold by any commonly used method, such as dipping, spraying, brushing, aerosol spraying, and coating with an impregnated cloth. Further, examples of molding materials formed by the molds coated with the surface treatment agent include resins, such as polyurethane, polycarbonate, epoxy resin, phenol resin, polyimide resin, and vinyl chloride resin; rubbers, such as natural rubber, chloroprene rubber, fluororubber; and the like.

Examples of base materials other than molds include molded articles of metals (oxides), potteries, ceramics, glass, resins, rubber, or the like.

EXAMPLES

The following describes the present invention with reference to Examples.

Example 1

(1) In a flask with a capacity of 2 L, 1226 g (8.0 mol) of phosphorus oxychloride and 5.5 g (0.05 mol) of calcium chloride were charged, and the mixture was stirred for 10 minutes. Then, 1000 g (1.0 mol) of the following compound:

CF$_3$CF$_2$CF$_2$O{CF(CF$_3$)CF$_2$O}$_4$CF(CF$_3$)CH$_2$OH     [PO-6-OH]

was added. The internal temperature was raised to 110° C., and the mixture was stirred for 24 hours. It was confirmed by 1H NMR that PO-6-OH disappeared, and the reaction was completed.

After removing low boiling substances at an internal temperature of 90 to 110° C. under a reduced pressure of 4.5 KPa, the degree of reduced pressure was set to 0.1 KPa, and vacuum distillation was performed at an internal temperature of 160° C., thereby obtaining 937.9 g (yield: 85%) of the following compound:

[CF$_3$CF$_2$CF$_2$O{CF(CF$_3$)CF$_2$O}$_4$CF(CF$_3$)CH$_2$O]$_2$POCl     [PO6PAECl]

having a purity of 99.2GC %.

(2) 937.9 g of the obtained PO6PAECl was charged into a flask with a capacity of 1 L, 7.8 g of water was slowly added dropwise so that the internal temperature did not exceed 60° C., and the mixture was vigorously stirred at an internal temperature of 50° C. After stirring for 24 hours, it was confirmed by 1H NMR that PO6PAECl disappeared, and the reaction was completed.

Dehydration was performed at an internal temperature of 50° C. under a reduced pressure of 0.1 KPa, thereby obtaining 808.9 g (yield: 90%) of a transparent liquid. $^1$H NMR and $^{19}$F NMR measurements were performed, and it was confirmed from the spectrum assignments that it was the desired product.

[CF$_3$CF$_2$CF$_2$O{CF(CF$_3$)CF$_2$O}$_4$CF(CF$_3$)CH$_2$O]$_2$PO(OH)

[CF$_3$CF$_2$CF$_2$O{CF(CF$_3$)CF$_2$O}$_4$CF(CF$_3$)CH$_2$O]PO(OH)$_2$     [PO6PAE]

([CF$_3$CF$_2$CF$_2$O{CF(CF$_3$)CF$_2$O}$_4$CF(CF$_3$)CH$_2$O]PO(OH)$_2$ was in a small amount and inseparable.)

$^1$H NMR (CDCl$_3$, TMS): ppm
  4.4 ppm (CFC$\underline{H}_2$)
  10.9 ppm (O$\underline{H}$)
$^{19}$F NMR (CDCl$_3$, C$_6$F$_6$): ppm
  −85.3 ppm ($\underline{CF_3}$)
  −83.0 to −85.3 ppm (CF$_3$CF$_2$$\underline{CF_2}$)
  −83.0 to −85.3 ppm CH$_2$CFCF$_3$(OCF$_2$CF$\underline{CF_3}$)

−83.0 to −85.3 ppm $CH_2CFCF_3(O\underline{CF_2}CFCF_3)$
−83.0 to −85.3 ppm $CH_2CF\underline{CF_3}(O\overline{CF_2}CFCF_3)$
−132.8 ppm $(CF_3\underline{CF_2})$
−137.6 ppm $CH_2\overline{\underline{CF}}CF_3(OCF_2CFCF_3)$
−147.5 ppm $CH_2\overline{CF}CF_3(OCF_2\underline{C}FCF_3)$ Example 2

(1) In a flask with a capacity of 500 ml, 215 g (1.4 mol) of phosphorus oxychloride and 0.94 g (0.0085 mol) of calcium chloride were charged, and the mixture was stirred for 10 minutes. Then, 300 g (0.17 mol) of the following compound:

$CF_3CF_2CF_2O\{CF(CF_3)CF_2O\}_7CF(CF_3)CH_2OH$    [PO-L-OH]

was added. The internal temperature was raised to 110° C., and the mixture was stirred for 24 hours. It was confirmed by $^1H$ NMR that PO-L-OH disappeared, and the reaction was completed.

After removing low boiling substances at an internal temperature of 90 to 110° C. under a reduced pressure of 4.5 KPa, the degree of reduced pressure was set to 0.1 KPa, and vacuum distillation was performed at an internal temperature of 100° C., thereby obtaining 255 g (yield: 78%) of the following compound:

$[CF_3CF_2CF_2O\{CF(CF_3)CF_2O\}_7CF(CF_3)CH_2O]_2POCl$    [POLPAECl].

(2) 255 g (0.13 mol) of the obtained POLPAECl was charged into a flask with a capacity of 300 mL, 7.8 g of water was slowly added dropwise so that the internal temperature did not exceed 60° C., and the mixture was vigorously stirred at an internal temperature of 50° C. After stirring for 24 hours, it was confirmed by $^1H$ NMR that POLPAECl disappeared, and the reaction was completed.

Dehydration was performed at an internal temperature of 50° C. under a reduced pressure of 0.1 KPa, thereby obtaining 189 g (yield: 77%) of a brown cloudy liquid. The spectrum assignments of $^1H$ NMR and $^{19}F$ NMR measurements were the same as those in Example 1.

$[CF_3CF_2CF_2O\{CF(CF_3)CF_2O\}_7CF(CF_3)CH_2O]_2PO(OH)$ $[CF_3CF_2CF_2O\{CF(CF_3)CF_2O\}_7CF(CF_3)CH_2O]PO(OH)_2$    [POLPAE]

($[CF_3CF_2CF_2O\{CF(CF_3)CF_2O\}_7CF(CF_3)CH_2O]PO(OH)_2$ was in a small amount and inseparable.)

Example 3

0.5 g of PO6PAE obtained in Example 1 was added to 99.5 g of a fluorine-containing organic solvent (NOVEC 7200, produced by 3M Company), and the mixture was stirred for about 30 minutes to prepare a preparation liquid A-1.

A chrome-plated copper plate test piece (25×75×1.2 mm) was dip-coated in the prepared solution A-1 for a dipping time of 5 seconds, a pulling speed of 2 mm/sec, and baking was performed at 150° C. for 1 hour.

The initial performance (the static contact angle was measured using hexadecane) was 73°, and the durability performance (sliding was performed 2000 times while applying a load of 20 g/cm² to the test piece using 100% cotton cloth, and then the static contact angle was measured using hexadecane) was 65°.

Example 4

In Example 3, POLPAE obtained in Example 2 was used in place of PO6PAE to prepare a preparation liquid B-2, and the initial performance and durability performance were measured using this liquid. As a result, the obtained values were 73° and 66°, respectively.

Comparative Example 1

In Example 3, the following compound:

$(CF_3CF_2CF_2CF_2CF_2CH_2CH_2O)_2PO(OH)$ $(CF_3CF_2CF_2CF_2CF_2CH_2CH_2O)PO(OH)_2$    [C6PAE]

$((CF_3CF_2CF_2CF_2CF_2CH_2CH_2O)PO(OH)_2$ was in a small amount and inseparable.)

was used in place of PO6PAE to prepare a preparation liquid C-3, and the initial performance and durability performance were measured using this liquid. As a result, the obtained values were 60° and 30°, respectively.

Example 5

65 g of isopropanol and 34.7 g of water were added to 0.1 g of PO6PAE obtained in Example 1, 0.2 g of triethylamine was added while stirring, and the mixture was stirred for about 30 minutes, thereby preparing a surface treatment agent A-4.

In an aluminum mold (diameter: 45 mm, depth: 50 mm) spray-coated with the surface treatment agent A-4 and preheated to 80° C., 100 parts by weight of polyurethane prepolymer (Coronate C-4090, produced by Nippon Polyurethane Industry Co., Ltd.) heated to 80° C. and 12.8 parts by weight of heated and melted methylenebis-o-chloroaniline curing agent (Iharacuamine MT, produced by Ihara Chemical Industry Co., Ltd.) were injected by stirring and mixing while avoiding inclusion of bubbles.

Before heat curing, a hook for removing the cured molded article was installed in the center of the injection part. After heat curing the injected material at 120° C. for 1 hour, the mold release load was measured when the molded article was removed from the mold by pulling the hook. The result was 10 N.

Further, after determining the mold release properties in this manner, the mold release agent (surface treatment agent A-4) was applied once, and the number of mold releases was measured at a mold release load of 50 N or less. As a results, mold release was possible up to 9 times.

Example 6

In Example 5, the surface treatment agent A-5 prepared using POLPAE obtained in Example 2 was used in place of the surface treatment agent A-4. As a result, the mold release properties were 10 N, and the mold release life was 11 times.

Comparative Example 2

In Example 5, the preparation liquid C-5 prepared using C6PAE obtained in Comparative Example 1 was used in place of the surface treatment agent A-4. As a result, the mold release properties were 15 N, and the mold release life was 2 times.

Comparative Example 3

In Example 5, a mold release test was performed using an aluminum mold to which a surface treatment agent was not spray-coated. As a result, the resulting polyurethane molded article was closely attached to the mold and could not be released from the mold.

The invention claimed is:

1. A method for producing a perfluoropolyether phosphate ester represented by the general formula:

$$[C_3F_7O\{CF(CF_3)CF_2O\}_nCF(CF_3)CH_2O]_2PO(OH)$$

wherein n is an integer of 1 to 20,
comprising reacting a perfluoropolyether alcohol represented by the general formula:

$$C_3F_7O\{CF(CF_3)CF_2O\}_nCF(CF_3)CH_2OH$$

wherein n is an integer of 1 to 20,
with phosphorus oxychloride at a molar ratio of 8 to 8.24 based on the perfluoropolyether alcohol in the presence of a calcium chloride dehydrating agent and hydrolyzing the obtained compound represented by the general formula:

$$[C_3F_7O\{CF(CF_3)CF_2O\}_nCF(CF_3)CH_2O]_2POCl$$

wherein n is an integer of 1 to 20.

* * * * *